United States Patent [19]
Sakabe et al.

[11] Patent Number: 5,343,105
[45] Date of Patent: Aug. 30, 1994

[54] AC GENERATOR FOR VEHICLES

[75] Inventors: Shigekazu Sakabe; Yutaka Kitamura, both of Hyogo, Japan

[73] Assignee: Mitsubishi Denki Kabushiki Kaisha, Tokyo, Japan

[21] Appl. No.: 11,119

[22] Filed: Jan. 29, 1993

Related U.S. Application Data

[63] Continuation of Ser. No. 676,587, Mar. 28, 1991, abandoned.

[30] Foreign Application Priority Data

Mar. 28, 1990 [JP] Japan ............... 2-79632

[51] Int. Cl.$^5$ ............... H02K 1/00; H02K 3/28; H02K 3/00
[52] U.S. Cl. ............... 310/179
[58] Field of Search ............... 310/263, 179, 171, 168, 310/180, 68 D

[56] References Cited

U.S. PATENT DOCUMENTS

| | | | |
|---|---|---|---|
| 3,518,473 | 6/1970 | Nordebo | 310/168 |
| 3,535,626 | 10/1970 | Uemura et al. | 318/254 |
| 4,097,754 | 6/1978 | Farr | 310/67 R |
| 4,280,072 | 7/1981 | Gotou et al. | 310/67 R |
| 4,792,710 | 12/1988 | Williamson | 310/184 |
| 5,122,705 | 6/1992 | Kusase et al. | 310/180 |

FOREIGN PATENT DOCUMENTS

| | | |
|---|---|---|
| 92958 | 7/1897 | Fed. Rep. of Germany . |
| 45283 | 7/1965 | France . |

OTHER PUBLICATIONS

Elektrotechnische Zeitschrift Ausgabe B, vol. 8, No. 11, May 21, 1976, Berlin, DE, pp. 337–338; W. Volkrodt: "Spulenwicklungen um einen Zahn".

Primary Examiner—Steven L. Stephan
Assistant Examiner—Clayton E. LaBalle
Attorney, Agent, or Firm—Sughrue, Mion, Zinn, Macpeak & Seas

[57] ABSTRACT

An AC generator for use in motor vehicles which is high in power generation and cooling efficiency. The magnetic circuit is so constructed that its number of slots per each pole and each phase is 0.5 and that its winding system is of concentrated winding. With such a construction, the total length of its stator coils can be reduced compared with that of the conventional machine. In addition, its output and efficiency are improved by the reduced temperature rise and a reduction in its structure and cost can be achieved by the reduced consumption of copper.

3 Claims, 5 Drawing Sheets

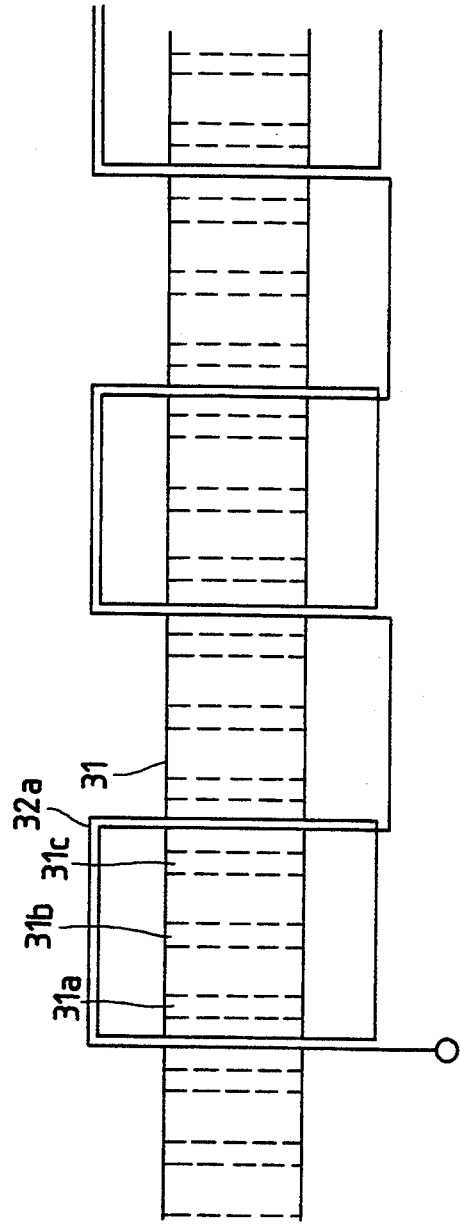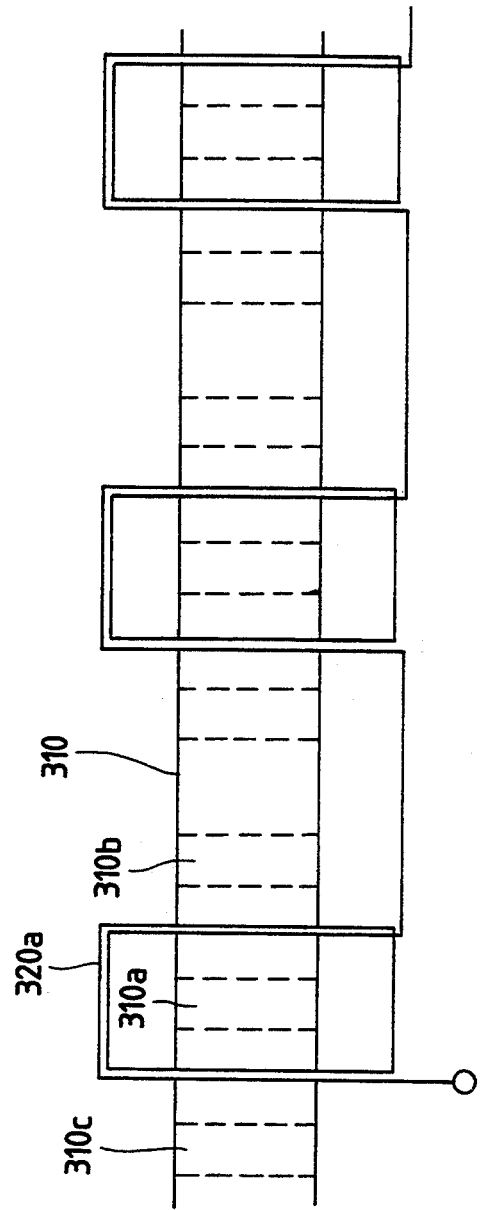

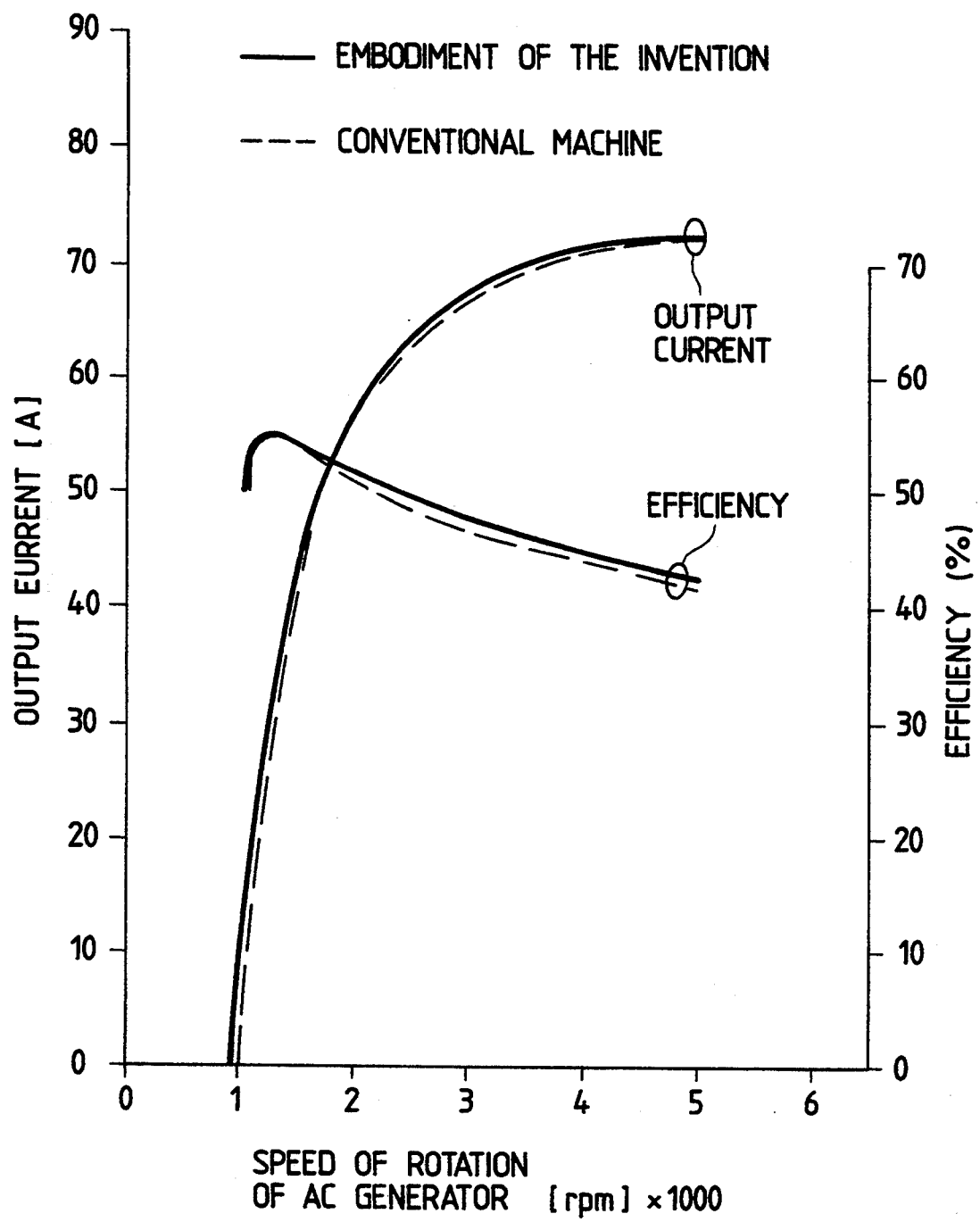

AC GENERATOR FOR VEHICLES

This is a continuation of application No. 07/676,587 filed Mar. 28, 1991, now abandoned.

BACKGROUND OF THE INVENTION

The invention relates to an AC generator for use in motor vehicles, which is capable of generating high power voltage, and which is high in both power generation efficiency and cooling efficiency.

FIG. 1 is a sectional view showing a conventional AC generator for use in motor vehicles. In FIG. 1, reference numeral 31 designates a stator core; 32, a stator coil wound around the stator core 31; 3, a stator including the stator core 31 and the stator coil 32; 1 and 2, a pair of first and second generally bowl-like brackets; 1a and 2a, cooling air inlets disposed at ends of the first and second brackets 1 and 2; 1b and 2b, cooling air outlets disposed at outer peripheral portions of the first and second brackets 1 and 2; 20, a bolt for clamping and securing the stator core 3 between opening ends of the first and second brackets 1 and 2 by inserting the opening ends to both outer peripheral end portions of the stator core 31; 4 and 5, bearings firmly inserted into the middle of both side surfaces of the first and second brackets 1 and 2; 6, a shaft rotatably supported on the bearings 4 and 5; 7 and 8, magnetic cores secured to the shaft 6 and located inside the stator 3; 9, an exciting coil (not shown) interposed between the inner peripheries of the magnetic cores 7 and 8; 10a and 10b, a pair of fans which are secured to end surfaces of the magnetic cores 7 and 8 the fans rotating as the shaft 6 rotates; 11, a slip ring secured to the shaft 6; 12, a rotor including of the shaft 6, the magnetic cores 7 and 8, the exciting coil 9, the fans 10a and 10b, and the slip ring 11; 13, a collector unit holding a brush 13a which is in slidable contact with the slip ring 11 and disposed at an inner end surface of the second bracket 12; 14, a rectifier which converts an AC current to a DC current by rectifying the AC current while supplying exciting current to the exciting coil 9 through the slip ring 11 from the brush 13a and rectifying the AC current induced at the stator coil 32 by causing the magnetic cores 7 and 8 to be rotated by a prime mover (not shown) through a pulley 15; 16, a voltage adjustor which adjust a terminal voltage to a predetermined value by controlling the exciting current while detecting a generator voltage; and 16a, a heat sink for releasing heat generated at the voltage adjustor 16.

FIG. 2 is a schematic diagram showing the stator 3 for a description of the magnetic circuit configuration and winding system of the conventional AC generator applied to vehicles. Shown in FIG. 2 is a 3-phase, 12-pole, 36-slot configuration with the number of slots per each pole and each phase, which represents the number of slots per the product of the number of poles and the number of phases is 1. The three phases are designated by phase A, phase B and phase C. Reference numeral 32a designates a coil for phase A; 32b, a coil for phase B; and 32c, a coil for phase C. Reference numerals 31a, 31b, 31c, 31d, 31e, 31f, and 31g designate tooth portions constituting part of a magnetic path of the stator core 31, while 7a and 8a, 8b designate claw magnetic poles which confront the tooth portions and which constitute the magnetic cores 7, 8. Assuming that the claw magnetic pole 7a is magnetized into an N pole, each of the claw magnetic poles 8a, 8b is magnetized into an S pole.

An operation of the conventional AC generator applied to vehicles will be described.

The exciting coil 9 is supplied with exciting current through the brush 13a and the slip ring 11, thereby causing the claw magnetic pole 7a to be magnetized as an N pole and each of the claw magnetic poles 8a and 8b as an S pole. A magnetic flux $\phi$ passes from the N pole of the claw magnetic pole 7a to the claw magnetic poles 8a and 8b through the tooth portions 31a, 31b and 31c of the stator core 31. Since the coil 32a of phase A is wound around the tooth portions 31a, 31b and 31c, the coil 32a of phase A intersects the magnetic flux $\phi$ passing through the tooth portions 31a, 31b and 31c, and the movement of the claw magnetic poles 7a, 8a and 8b in the direction of an arrow z causes the magnitude and direction of the intersecting flux $\phi$ to change. As a result, a change in the intersecting flux $\phi$ generates an inductive electromotive force (EMF) at the coil 32a of phase A. Since the tooth portions 31a, 31b and 31c alternately confront the N and S poles, an AC EMF is induced at the coil 32a of phase A. Similarly, AC EMFs are induced at the coils 32b and 32c of phases B and C, respectively. A total of 6 coils are connected to each of phases A, B and C in series, and the AC EMFs induced at these phases are superposed on one another, generating AC current. This AC current is rectified by the rectifier 14 to be outputted as a DC current. The output voltage is adjusted to a constant value by the voltage adjustor 16.

A cooling structure will be described hereinafter.

When the rotor 12 is rotated by a drive mechanism (not shown) through the pulley 15, the fans 10a and 10b secured to the rotor 12 start rotating to allow a cooling air from the inlet 1a of the first bracket 1 as shown by the arrow (a) shown in FIG. 1. After cooling the bearing 4, the magnetic core 7, the exciting coil 9, the stator core 31 and the stator coil 32, the cooling air is discharged outside from the outlet 1b. Simultaneously, the cooling air is introduced from the inlet 2a of the bracket 2 as shown by arrow (b) to cool the bearing 5, the voltage adjustor 16, the rectifier 14, the magnetic core 8, the magnetic coil 9, the stator core 31 and the stator coil 32 and discharged from the outlet 2b.

The conventional AC generator equipped to motor vehicles is constructed as above. However, to meet the recent demand for particularly large output current, such a conventional AC generator is required to increase an exciting current. This results in an increase in heat generated by the voltage adjustor 16 and also in an increase in heat generated by the stator coil 32 and the rectifier 14 due to increased output current.

Particularly, the increase in heat generated at the stator coil 32 has so far been taken care of by decreasing its resistance while increasing the diameter of its conductor. However, there is a limit in increasing the conductor diameter in view of winding work. In addition, the demand for higher output current and smaller structure may eventually lead to impairment of generation characteristics due to heat resistance limitations. The invention has been accomplished in view of the above circumstances.

SUMMARY OF THE INVENTION

Accordingly, an object of the invention is to provide an AC generator for motor vehicles which is capable of generating a higher output, increased efficiency, and smaller structure and economization as a result of decreased consumption of copper by improving the magnetic circuit structure of the stator core and the method of winding the stator coils.

The AC generator for vehicles according to the invention is provided with a stator core having a plurality of slots, and the number of slots per each pole and each phase of the stator core is 0.5. That is, $$\text{That is, } \frac{\text{(No. of slots)}}{\text{(No. of poles)(No. phases)}} = 0.5.$$

Further the stator coils are wound in concentrated form around tooth portions which form the slots.

The invention, in which the number of slots per each pole and each phase is 0.5 and the stator coils are wound around its tooth portions in concentrated winding form, allows the total length of each coil for each phase to be reduced. Consequently, not only its resistance is reduced and the heat produced therefrom can be suppressed, but also the output and power generation efficiency can be increased and a reduction in structure and cost can be achieved by the smaller consumption of copper.

BRIEF DESCRIPTION OF THE DRAWINGS

In the accompanying drawings:

FIGS. 5(A) and (B) are explanatory diagrams in which only winding portions shown in FIGS. 2 and 3 are compared in developed form, FIG. 5 (A) being a developed schematic of FIG. 2 and FIG. 5(B) being a developed schematic of FIG. 3; and FIG. 6 is a graphical representation in which outputs and power generation efficiencies between the conventional generator and the embodiment of the present invention are compared.

DESCRIPTION OF THE PREFERRED EMBODIMENTS

An embodiment of the invention will be described with reference to FIGS. 3, 4, 5 and 6.

Figure 3:
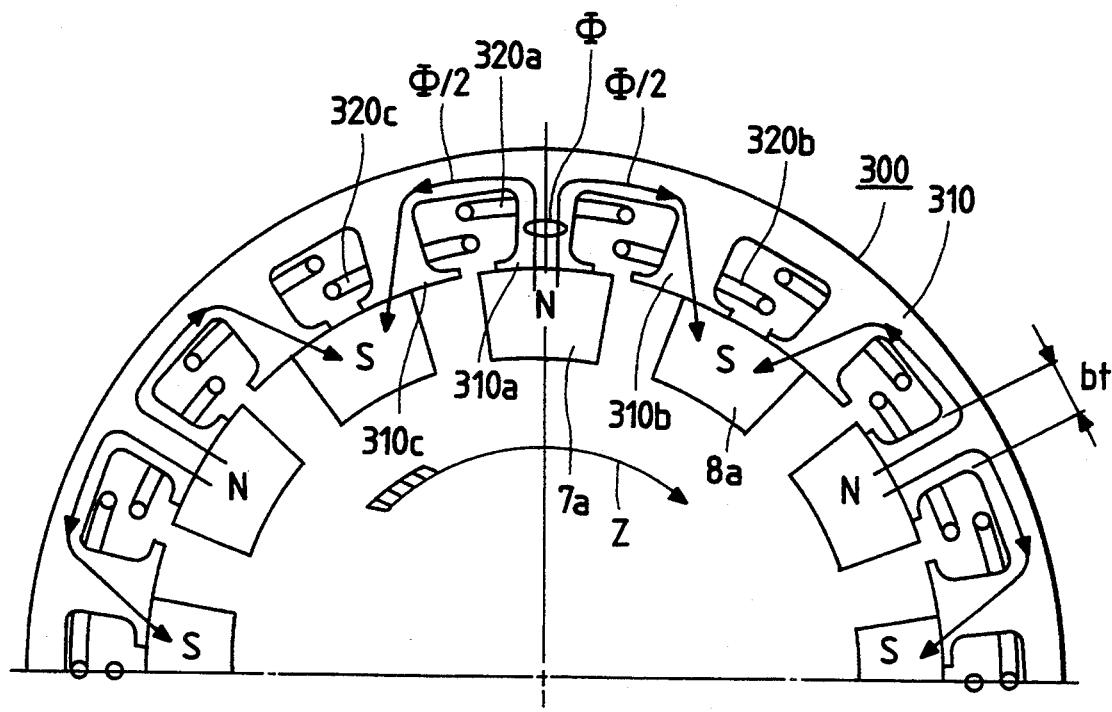
FIG. 3 is a schematic diagram showing an embodiment of the present invention with the magnetic circuit configuration and winding system of a stator presented for description.

In these figures, the same reference numerals designate the same or like parts and components in the conventional generator. FIG. 3 which shows an embodiment of the invention, is a schematic diagram for a description of the configuration of a magnetic circuit and the winding system, a 3-phases, 12-poles, and 18-slots configuration with the number of slots per each pole and each phase of a stator core being $$\frac{(18)}{(12) \times (3)} = 0.5.$$

The three phases are designated as phase A, phase B and phase C, and reference numeral 320a designates a coil of phase A; 320b, a coil of phase B and 320c, a coil of phase C. Reference numerals 310b and 310c are tooth portions constituting part of a magnetic path of a stator core 310.

Figures 4A, 4B:
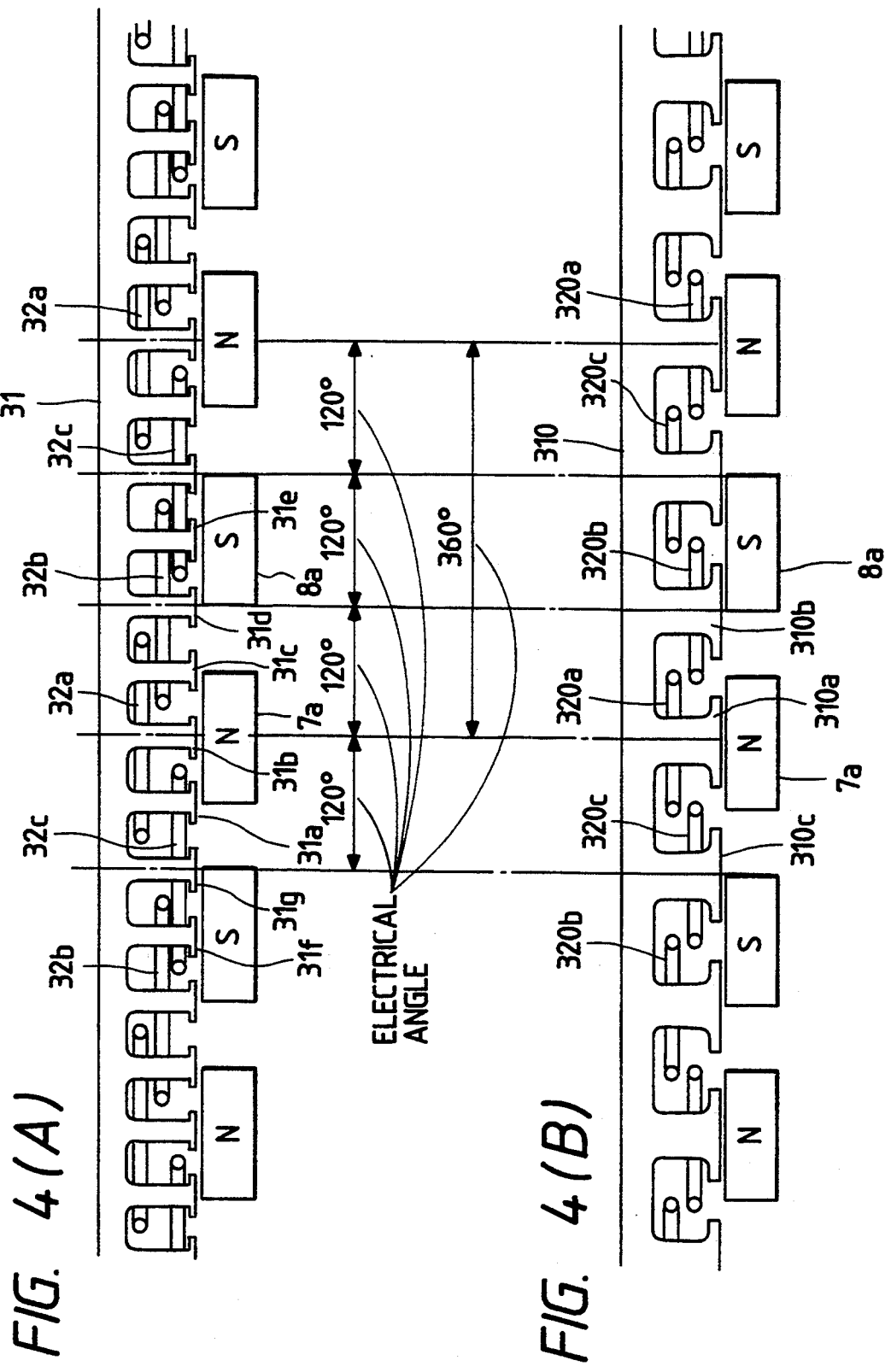
FIGS. 4(A) and (B) are explanatory diagrams for the description concerning the comparison of the conventional generator shown in FIG. 2 and the embodiment of the present invention shown in FIG. 3.

The coil 320a of phase A is wound around the tooth portion 310a the coil 320b of phase B is wound around the tooth portion 310b and the coil 320c of phase C is wound around the tooth portion 310c. That is, the coils 320a, 320b and 320c are wound around the tooth portions 310a, 310b, 310c in concentrated winding form. FIGS. 4(A) and 4(B) are schematic diagrams in which the conventional generator shown in FIG. 2 and the embodiment of the invention shown in FIG. 3 are compared in developed form, of which FIG. 4(A) being a developed schematic of the conventional generator and FIG. 4(B), of the generator of the invention, each with positional relations among phases A, B, C.

Figure 1:
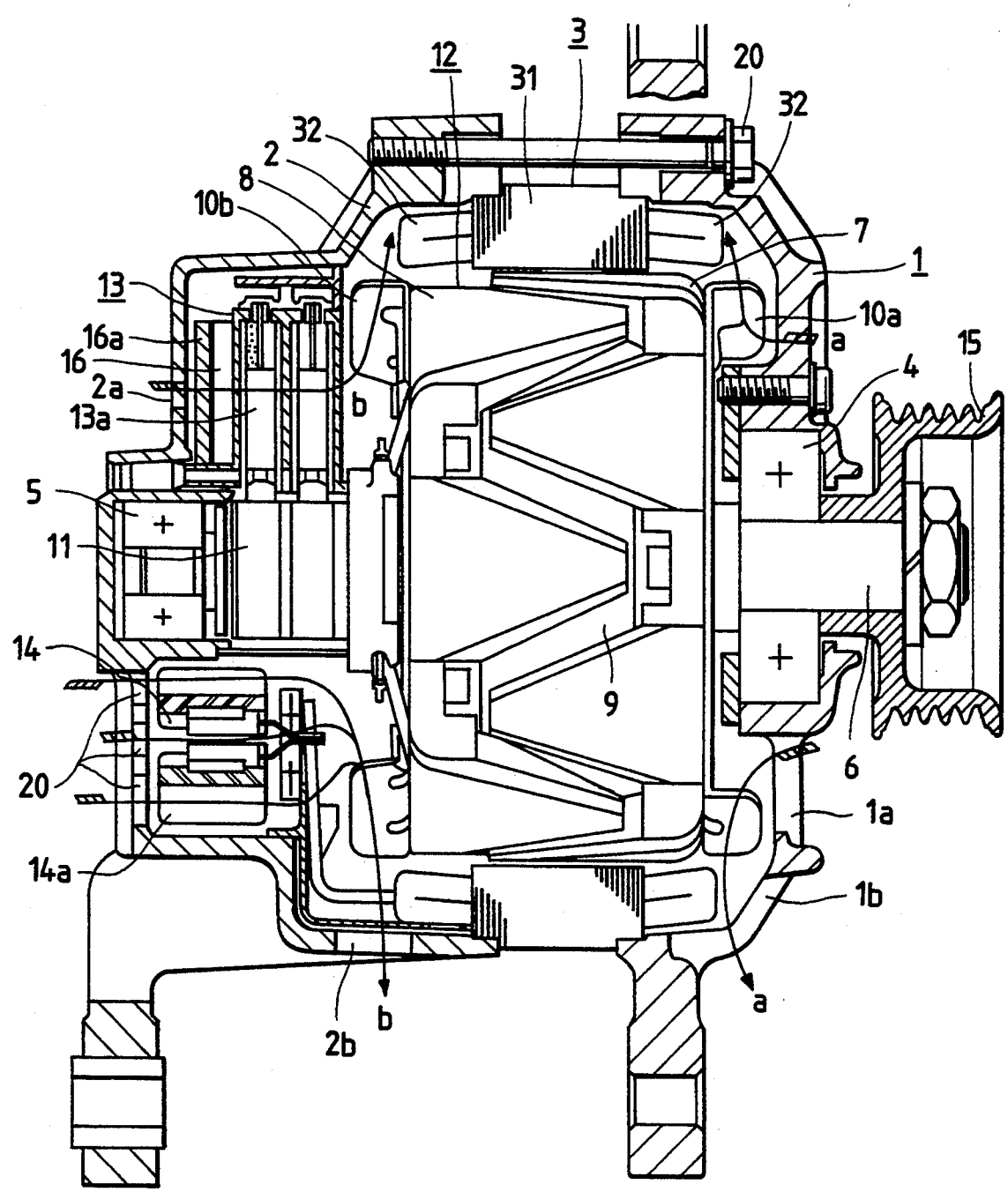
FIG. 1 is a schematic diagram illustrating a cross-section in an axial direction of a conventional generator.
Figure 2:
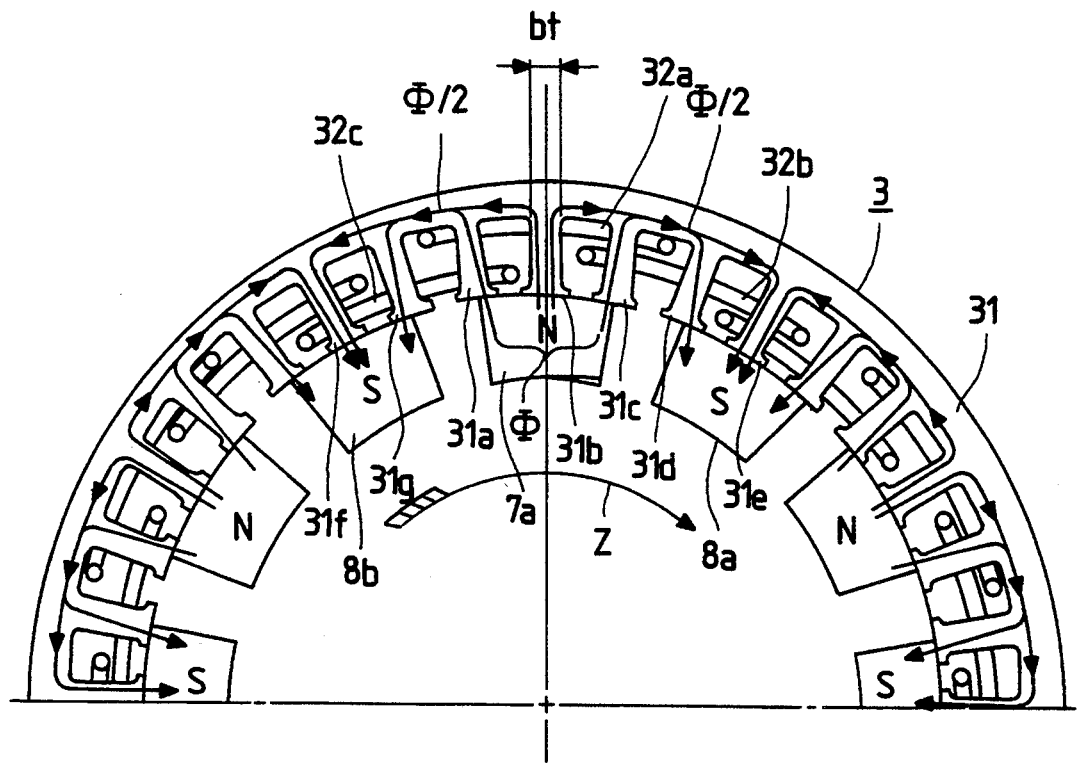
FIG. 2 is a schematic diagram showing the magnetic circuit configuration and winding system of a stator of the conventional generator.

FIGS. 5(A) and 5(B) are schematic diagrams in which only winding portions shown in FIGS. 2 and 3 are compared in developed form, of which FIG. 5(A) is a developed schematic of the conventional machine and FIG. 5(B), of the machine of the invention.

By the way, the width bt of the tooth portions shown in FIG. 3 is about twice as much as the width bt of the tooth portion 310b of the conventional machine shown in FIG. 2, and so are the widths of the other tooth portions 310b, 310c. This results from such a design of magnetic circuit that the magnetic flux density $\phi$ per pole, which is the sum of all the magnetic flux densities passing through the tooth portions 31a, 31b, 31c of the conventional machine, can run through the tooth portion (310a) of the embodiment of the invention. The diameter of the stator 3 remains the same as that of the conventional machine.

The number of turns per coil of each phase A, B or C is the same in both the conventional machine shown in FIG. 2 and the embodiment of the invention shown in FIG. 3. Shown in FIG. 5 is an example in which the number of turns per coil is 2. In this example, the flux $\phi$ runs from the claw magnetic pole 7a magnetized by the N pole to the S poles of the claw magnetic poles 8a and 8b through the tooth portion 310a of the stator core 310, thereby intersecting the coil 320a of phase A wound around the tooth portion 310a. The rotation of the claw magnetic poles 7a, 8a and 8b in a direction of arrow Z changes the magnitude and direction of the intersecting flux $\phi$. And a change in the intersecting flux $\phi$ generates an inductive electromotive force (EMF) at the coil 320a of phase A. Similarly, AC EMFs are induced at the coils 320b and 320c of phases B and C, respectively. As in the conventional machine, a total of 6 coils are connected to each phase A, B or C in series, and the AC EMFs induced at these phases are superposed on one another, generating an AC current. This AC current is rectified by the rectifier 14 to be outputted as DC current.

As is well known, for the three-phase AC generator such as the conventional generator, its no-load voltage V per phase can be expressed as follows.

$$V \alpha Z \cdot f \cdot \phi$$

where Z is the number of conductors per phase connected in series (=(the number of turns per coil/2)×the number of poles); f is the frequency (Hz) and $\phi$ is the magnetic flux density (Wb) per pole.) Thus, the no-load voltage V is proportional to the number of conductors per phase connected in series Z, the frequency f and the magnetic flux density per pole $\phi$. Therefore, as shown by the embodiment of the invention, the magnetic circuit is constructed so that the AC generator is a three-phase machine and its magnetic flux density per pole $\phi$ is the same as that of the conventional machine. Assuming that the number of conductors per phase connected in series Z is the same and if the frequency f (i.e., the number of poles and the number of revolutions) is the same, the same AC EMF is induced and the same AC current can be generated. Thus, the embodiment of the present invention has the same output capacity as that of the conventional one.

However, in actuality, as shown in FIG. 5, the embodiment of the invention has the conductor length per coil shorter by a value obtained by multiplying the tooth width (bt) by the number of turns, compared with that of the conventional machine. That is, in the developed schematic of the conventional machine shown in FIG. 5(A), the coil 32a is wound spreading over the tooth portions 31a, 31b and 31c, which is of distributed winding system, while the coil 320a of the embodiment of the invention shown in FIG. 5(B) is wound only around the tooth portion 310a, which is of concentrated winding form. Since the tooth portion 310a has a width bt which is about twice as much as that of the tooth portion of the conventional generator, its coil length is shorter than that of the conventional machine by a value substantially equal to the width bt of the conventional machine. Hence, the resistance of the stator coil is reduced thereby reducing the copper loss. This decreases the temperature rise, improves the power generation efficiency and increases the output power.

Experiments conducted on the embodiment of the invention presented the results shown by the solid line in the output and power generation efficiency characteristic diagram shown in FIG. 6. An increase of about 4 A (maximum) in output is exhibited by the embodiment of the invention in the low rotational speed range up to 1700 rpm, and an improvement of about 1 to 1.5% in the efficiency is observed in the range over 1500 rpm.

As described in the foregoing, according to the invention, the magnetic circuit is constructed so that its number of slots per each pole and each phase of a stator core is 0.5 and that its winding form is of concentrated winding form. Therefore, the total length of its stator coils can be reduced compared with that of the conventional machine. In addition, its output and power generation efficiency are improved by the reduced temperature rise and a reduction in its structure and cost can be achieved by the reduced consumption of copper.

What is claimed is:

1. An AC generator for use in motor vehicles, comprising:
   a stator winding for each phase of said generator, wherein each stator winding comprises at least a pair of stator coils; and
   a stator core having tooth portions which form a plurality of stator slots in an inner periphery thereof, wherein $$\frac{\text{(No. of stator slots)}}{\text{(No. of rotor poles)(No. of generator phases)}} = 0.5,$$

each of said stator coils is wound around a corresponding individual one of said tooth portions thereof, and
   each of said tooth portions has one of said stator coils wound around it.

2. In an AC generator for use in motor vehicles, said AC generator including a rotor having a plurality of rotor poles, an improved stator comprising:
   a stator core having a plurality of tooth portions, wherein each pair of adjacent pairs of said tooth portions define one of a plurality of stator slots in an inner periphery of said stator core;
   a stator winding for each respective phase of said AC generator, wherein said stator winding comprises a plurality of coils, each of said tooth portions having wound around it a respective one of said coils so as to provide a respective coil surrounding each of said tooth portions; and
   wherein said AC generator satisfies a condition such that $$\frac{\text{(No. of stator slots)}}{\text{(No. of rotor poles)(No. of generator phases)}} = 0.5.$$

3. An AC generator for use in motor vehicles, said generator having a plurality of phases and a stator winding for each phase, each said stator winding including at least two stator coils, thereby providing at least two stator coils for each phase;
   said AC generator including
   a rotor having a plurality of rotor poles and
   a stator core having tooth portions which form a plurality of slots in an inner periphery thereof, wherein:
   the ratio of the number of said slots to the product of the number of said rotor poles and the number of said phases is equal to 0.5;
   each of said stator coils is wound around a corresponding individual one of said tooth portions thereof; and
   each of said tooth portions has one of said stator coils wound around it.

* * * * *